Dec. 13, 1960 W. H. RADER 2,964,515
ETHYLENE POLYMERIZATION PROCESS
Filed July 1, 1957
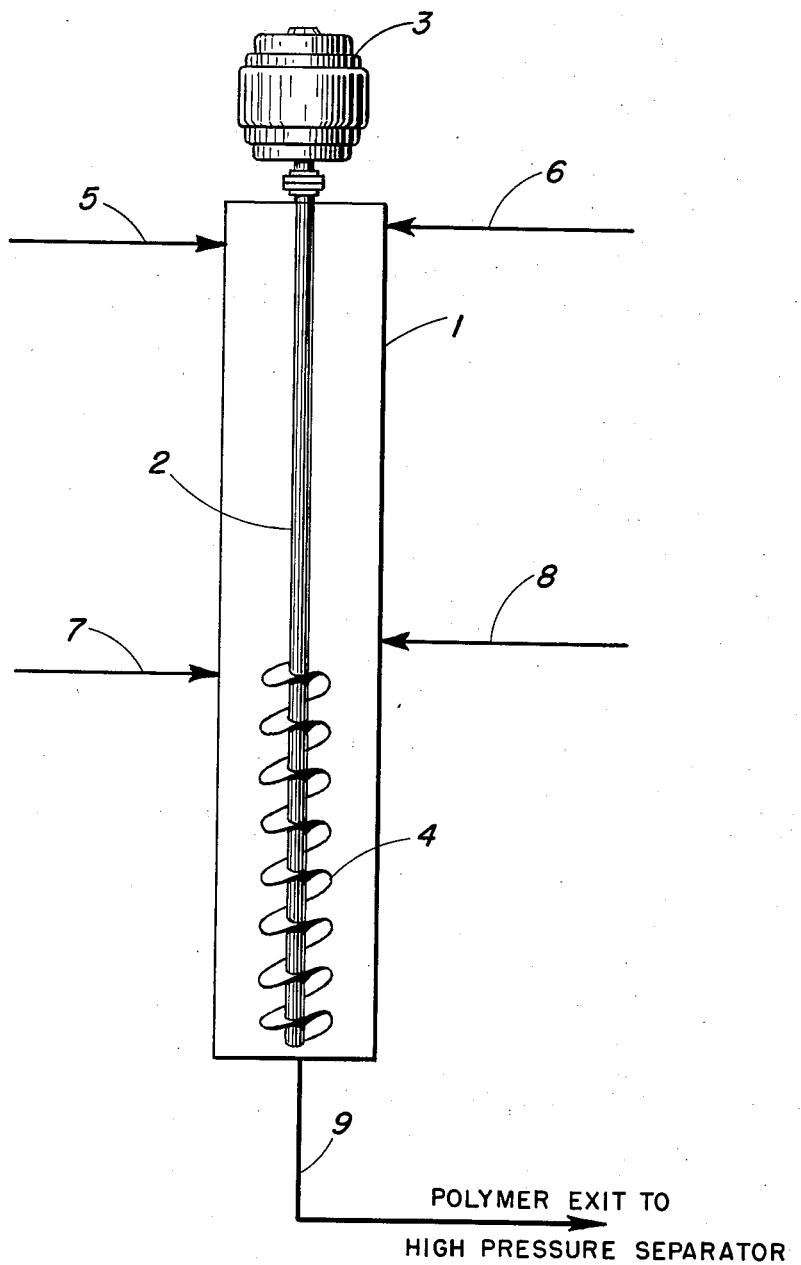
POLYMER EXIT TO
HIGH PRESSURE SEPARATOR
WILLIAM H. RADER
*INVENTOR.*
BY *Mitchell F. Condor*

United States Patent Office 2,964,515
Patented Dec. 13, 1960

2,964,515

ETHYLENE POLYMERIZATION PROCESS

William H. Rader, Champaign, Ill., assignor to National Distillers and Chemical Corporation Filed July 1, 1957, Ser. No. 669,316

9 Claims. (Cl. 260—94.9)

The present invention relates to an improved process for preparation of high molecular weight, high density polyethylenes having a density of above about 0.93. Still more particularly, the process of this invention relates to polymerization of ethylene under conditions to provide, as a product of the polymerizaiton reaction, a composition that has excellent high pressure flow properties and comprises a broad molecular weight distribution of high density polyethylenes. As compared to preparation of high density polyethylenes by processes utilizing elevated pressures and moderately low temperatures, wherefrom a solid polymer is formed that imposes a substantial burden on agitating equipment in high pressure reactors and necessitates fusing the polymer in the reactor effluent for separation of the polymer from unreacted ethylene, the process embodied herein enables the direct preparation of high density polyethylene without imposing an objectionable burden on agitating equipment and obviates the need for fusing the polymer product prior to subjecting the polymerization reactor effluent to a high pressure separator for separating the high density polymers from unreacted ethylene. A particular advantage obtained by practice of this invention is that it can be carried out in conventional high pressure ethylene polymerization reactors, utilized for preparation of conventional lower density polymers, without substantial change or modification of such conventional reactors.

Due to a growing interest in polyethylenes of a density higher than about 0.920 which possess increased mechanical stiffness over lower density polymers and are useful for making articles of greater rigidity, considerable activity has and is being carried out for development of processes for preparation of high density polymers. In one general type of method, ethylene is subjected to polymerization at an elevated pressure, moderately low temperatures and in the presence of a suitable chain transfer agent whereby there is produced a solid high density polymer withdrawn from the polymerization reactor in a gas-solid phase with unreacted ethylene. In the use of a conventional, stirred high pressure reactor for producing such high density polyethylenes, the formation of the solid polymer imposes a substantial burden on the stirring mechanism and increases power consumption requirements. Moreover, as the effluent issuing from the reactor is a gas-solid phase under a high pressure, it is usually necessary to heat the product from the reactor to fuse the polymer prior to subjecting same in mixture with unreacted ethylene to means, such as a high pressure separator, to remove the unreacted ethylene from the polymer and recycle the ethylene as feed to the polymerization reactor. Thus, in carrying out polymerization of ethylene at temperatures on the order of below about 150° C., particularly below about 120° C., to form high density polyethylene, the high density polyethylene is in the form of a solid powdered material that imposes difficulties in the polymerization operation and handling of the reactor effluent as aforesaid.

In accordance with this invention, ethylene is subjected in a continuous catalytic process to initial reaction under conditions to form a gas-solid phase, said conditions including a moderately low temperature and elevated pressure in presence of a suitable chain transfer agent, and the gas-solid phase is passed into a second reaction zone wherein ethylene is subjected to polymerization at a higher temperature than exists in the initial zone, said second reaction zone being maintained at an elevated pressure under conditions wherein ethylene fed thereto is polymerized in presence of a suitable catalyst in presence of a suitable chain transfer agent to form a gas phase in which the solid polymer from the initial reaction zone dissolves thereby providing an effluent comprising a gas phase of good flow characteristics and comprising high density polyethylenes in mixture with unreacted ethylene and which effluent can be subjected to conventional separation methods for removal of unreacted ethylene and recycle as feed to each or both of the aforesaid polymerization zones.

In a particularly suitable embodiment, the process embodied herein is carried out in a single, vertically elongated high pressure reaction zone. Ethylene, catalyst and chain transfer agent are fed into the upper portion of said zone while maintaining therein a moderate temperature, correlated with effectiveness of the catalyst employed, to form a solid polyethylene which descends into the bottom portion of said zone which is maintained under effective agitation. At a point in said zone substantially below the feed of the aforesaid ethylene, catalyst and chain transfer agent, an additional feed of ethylene, catalyst and chain transfer agent is introduced. The lower portion of said zone is maintained at a temperature substantially higher than is maintained in the upper portion of said zone whereby, by correlation of the catalyst and temperature present in the lower portion, a gas phase is formed in which dissolves the solid polymer that descends from the upper portion in which a moderately low temperature is employed for formation of high density polyethylene. Thus, from the bottom of the reactor, there is withdrawn an effluent under high pressure that is a solution of high density polyethylene in unreacted ethylene. In a continuous system, the effluent from the polymerization reactor is reduced in pressure to effect the insolubility of the polyethylene in the unreacted ethylene and is then passed to a suitable conventional separator to separate the unreacted ethylene from the polymer and the ethylene recycled to the process as ethylene feed to the polymerization reaction.

The polymerization process embodied herein is carried out at an elevated pressure and, for illustration, at pressures of above 10,000 p.s.i. and up to 50,000 p.s.i. or more, with a highly suitable pressure being in the range of from about 15,000 p.s.i.g. to about 25,000 p.s.i.g. throughout the entire polymerization reaction zone. As to temperatures, the initial polymerization such as in the upper portion of the vertically elongated polymerization zone is maintained at an elevated temperature but below about 150° C. and preferably from about 20 to about 120° C. such that a solid polymer is formed that passes in a gas-solid phase to the secondary reaction zone, such as in the bottom portion of the vertically elongated polymerization zone. In the bottom portion of said zone, in which the vessel contents are maintained under effective agitation, the polymerization is carried out under a substantially higher temperature than in the initial polymerization zone. The higher temperature is such that the polymerization reaction forms a gas phase of unreacted ethylene-polymer and in which the solid polymer descending from the upper polymerization zone dissolves. Generally, the temperature at which the secondary polymerization zone is maintained is above 150° C., and preferably, from about 170° C. to 250° C.

For production of high density polyethylene by the herein described process, the particular catalysts employed in each or both of the polymerization zones are selected from ethylene polymerization catalysts that effect the desired polymerization under the pressure-temperature conditions under which the process is operated. Thus, for the initial reaction to form a solid polymer in the hereindescribed process carried out at elevated pressures, a moderately low temperature polymerization catalyst is used. Such catalysts include peroxydicarbonate esters such as isopropyl peroxydicarbonate (active at 100° C. and above), isoamyl peroxydicarbonate (active at 100° C. and above), pivalyl peroxide (active at 80° C. and above), etc. For the higher temperature polymerization, such as is carried out in the bottom portion of the vertically elongated polymerization zone wherein a gas phase is formed at a temperature sufficient to dissolve the solid polymer descending thereinto, suitable ethylene polymerization catalysts include di-tertiary-butyl peroxide, lauroyl peroxide and benzoyl peroxide active at 150° C. and above. Still other catalysts useful for practice of this invention are substances such as alkyl and aryl hyponitrites (active at 15–50° C.), α-substituted aryl peroxides (active at 20–60° C.), and others. Specific examples thereof include methyl, ethyl, isobutyl and benzyl hyponitrites, diisobutyryl and di-pivalyl peroxide, bis-trichloroacetyl peroxide and bis-α-methoxy isobutyryl peroxide. Generally, the catalysts are used in amounts of from about 5 to about 100 parts/million parts of the ethylene with 10 parts/million being satisfactory for most purposes. In general, the invention embodied herein is not limited to a particular catalyst or combination of catalysts but to use in each of the polymerization zones of catalysts that effectively polymerize ethylene and are active at the particular temperatures employed in each of said zones.

For use as chain transfer agents, the invention can be carried out with any of the many agents suitable as chain transfer agents in ethylene polymerization. Thus, substances such as hydrogen, propane, cyclohexane and isobutane are particularly suitable but others such as the following can also be used: carbon tetrachloride, chloroform, hexachlorethane, saturated halogenated carboxylic acids and their esters, aldehydes, alkyl esters of inorganic oxyacids of sulfur, phosphorous, silicon, and mercaptans. Such agents possess the ability to control molecular weight of the ethylene polymers in high pressure reactions and, in general, can be used in amounts of from 0.5 to about 10.0% and more, by volume, based on the ethylene.

In a particularly suitable embodiment, the process embodied herein is carried out by use of a vertically elongated high pressure reaction zone (overall pressure about 20,000 p.s.i.) into the upper portion of which ethylene at −100° to 35° C. is introduced and the reaction zone (upper portion) is operated at 0 to 120° C. with introduction of a low temperature catalyst and chain transfer agent. The solid polymer that is formed descends as a gas-solid phase into the bottom agitated portion of said zone into which a second ethylene feed is introduced along with chain transfer agent and a catalyst with the lower portion of the polymerization zone being maintained at about 220° C., the catalyst introduced into the lower portion being one that is effective at that temperature. By maintaining effective agitation in the lower portion of the polymerization, the solid polymer descending thereinto is dissolved in the ethylene and, along with newly formed polymer in the lower portion of said zone, there is withdrawn a composition from the bottom of the reaction zone which can be reduced in pressure by conventional means and separated into a polyethylene polymer which has excellent high pressure flow properties and a gas composed of unreacted ethylene which can be recycled. By proper correlation of concentrations of chain transfer agent, proportion of polymer produced in the lower higher temperature portion of the polymerization zone, etc., the density of the polymer product withdrawn from the polymerization zone can be controlled while obtaining a product having excellent high pressure flow properties and which does not require heating to fusion prior to separation as is necessary in processes which produce a low density solid polymer (gas-solid). Thus, in practice of this invention, the polymerization in the initial zone is carried out under conditions to produce a polyethylene of a density substantially higher than about 0.93, such as up to about 0.95 and a polymer of lower density is produced in the secondary zone in an amount correlated with its density to provide an effluent polymer having a density in the range of 0.93 to about 0.95.

In order to further describe the invention, the following embodiment is set forth which is described with reference to the accompanying drawing schematically showing a reactor useful for carrying out the process embodied herein. Such a reactor comprises a high pressure vessel 1 in which is disposed a suitable agitating means, such as stirrer 2 driven by motor 3 with means such as impellers 4 for effective stirring of the vessel contents in the bottom portion of reactor 1. As shown, vessel 1 is provided with a catalyst inlet 5, ethylene inlet 6, a second catalyst inlet 7 and second ethylene inlet 8, and with a conduit 9 for withdrawing polymerization product from the bottom of vessel 1.

In a specific embodiment utilizing such a high pressure vessel, in which the overall pressure is 20,000 p.s.i., ethylene is fed at 35° C. via ethylene inlet 6, with the ethylene feed containing 5% (by volume) of cyclohexane. Via catalyst inlet 5, isopropyl peroxydicarbonate (0.003 based on ethylene) is introduced into the reactor. With the stirrer 2 in operation, and operating at 105° C. and a residence time of 0.86 minute in the upper portion of vessel 1, a 4% conversion of ethylene is effected to a solid polymer having a melt index of 0.10. That polymer in a gas-solid phase descends in vessel 1 into the lower portion thereof into which ethylene (at 35° C.) plus cyclohexane (5% on ethylene) is introduced via ethylene inlet 8 and lauroyl peroxide via inlet 7 (0.009% on ethylene introduced via line 8 plus unreacted ethylene descending into the bottom zone). Within the bottom portion of vessel 1, operating at 175° C., and at a residence time of 0.54 minute, a 9% conversion occurs based on the ethylene fed via inlet 8 and 5% on unreacted ethylene that descends from the upper zone, the polymer produced in the bottom zone having a melt index of about 10.0. From the bottom of vessel 1, a product is withdrawn and in which the polyethylene has a melt index of about 2.5 and a density of 0.935. The withdrawn product is passed to a high pressure separation zone to remove the unreacted ethylene which is recycled to the ethylene feed inlet or inlets of vessel 1.

Thus, as is apparent from the foregoing description of the invention, a method is provided for production of high density polyethylene with use of high pressure reactors, such as employed for preparation of conventional lower density polyethylenes, without requiring material revisions of such reactors while obviating the difficulties normally attendant to use of such reactors in production of high density polyethylene as a gas-solid effluent that imposes problems for effective agitation in the reactors and require further processing (e.g., fusion) prior to being subjected to conventional high pressure separation for removal of unreacted ethylene from the effluent. Such difficulties are obviated by use of a multiple zone polymerization as hereinbefore described coupled with use of a semi-stirred reactor (i.e., in the bottom zone) along with use of a substantial temperature spread between the moderate elevated temperature in the initial polymerization zone and the higher temperature secondary, or lower polymerization zone. Thus, in the hereindescribed process, fusion of the high density polymer is effected in the polymerization reaction zone itself, thereby eliminating need of an external fusion operation, to provide a high density polyethylene in a form having excellent high pressure flow properties.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein. Thus, for example, there is shown in the specific embodiment the separate introduction of catalyst and ethylene feed to the polymerization zone but, if desired, the catalyst to each of the polymerization zones can be introduced with the ethylene feed to each of the zones.

What is claimed is:

1. A process for preparation of polyethylene having a density of above about 0.93 which comprises, in an initial polymerization zone, polymerizing ethylene at an elevated pressure and below about 150° C. in the presence of a chain transfer agent and a polymerization catalyst effective for polymerizing ethylene at said temperature to produce in said initial zone a solid-gas phase comprising unreacted ethylene and solid polyethylene having a density substantially above 0.93, passing said gas-solid phase from said initial zone into a second polymerization zone maintained under agitation, polymerizing ethylene in said second zone at an elevated pressure and above 150° C. in the presence of a chain transfer agent and an ethylene polymerization catalyst effective for polymerizing ethylene in said second zone to produce in said second zone a gaseous phase comprising unreacted ethylene and polyethylene having a lower density than the polyethylene produced in said initial zone, and in which gaseous phase the solid polyethylene from said initial zone dissolves to provide as a product of said second zone a gaseous phase comprising unreacted ethylene and polyethylene having a density of above about 0.93, said catalyst in said initial zone being from the group consisting of organic hyponitrites and organic peroxides active for polymerizing ethylene at below about 150° C. and said catalyst in second zone being an organic peroxide active for polymerizing ethylene at above 150° C.

2. A process, as defined in claim 1, wherein both the initial and second zone are maintained at a pressure of from 10,000 to 50,000 p.s.i.

3. A process, as defined in claim 2, wherein the catalyst in the initial zone is isopropyl peroxydicarbonate, the chain transfer agent in both zones is cyclohexane and the catalyst in the second zone is lauroyl peroxide.

4. A process, as defined in claim 1, wherein in each zone the catalyst is present in an amount, by weight, of 5 to 100 parts by weight per million parts of ethylene.

5. A process, as defined in claim 1, wherein the chain transfer agent is present in each zone in an amount of 0.5 to 10% by volume based on the ethylene.

6. A process for preparation of polyethylene having a density of above about 0.93 which comprises, in a vertically elongated polymerization zone maintained at a pressure of from about 10,000 to about 50,000 p.s.i., introducing into the upper portion of said zone ethylene, a chain transfer agent and a polymerization catalyst effective for polymerizing ethylene at a temperature of below about 150° C. to produce in the upper portion of said zone at below about 150° C. a solid-gas phase comprising unreacted ethylene and solid polyethylene having a density substantially above 0.93, said solid-gas phase passing into the bottom portion of said zone, introducing into the bottom portion of said zone ethylene, a chain transfer agent and a catalyst effective for polymerizing ethylene at a temperature of above 150° C. to produce in said bottom portion maintained under agitation a gaseous phase comprising unreacted ethylene and polyethylene having a lower density than the solid polyethylene produced in the upper portion of said zone, said bottom portion of said zone being maintained at a temperature substantially above 150° C. to dissolve in the gaseous phase formed in the bottom portion the solid polyethylene that passes thereinto from the upper portion of said zone, and withdrawing a gaseous effluent from the bottom portion of said zone, said gaseous effluent comprising unreacted ethylene and polyethylene having a density of above about 0.93, said catalyst in said upper zone being from the group consisting of organic hyponitrites and organic peroxides active for polymerizing ethylene at below about 150 C. and said catalyst in said bottom zone being an organic peroxide active for polymerizing ethylene at above 150° C.

7. A process, as defined in claim 6, wherein the catalyst in the upper portion is isopropyl peroxydicarbonate, the chain transfer agent in both the upper and lower portion of said zone is cyclohexane and the catalyst in the bottom portion is lauroyl peroxide.

8. A process, as defined in claim 6, wherein in each portion of said zone, the catalyst is present in an amount, by weight, of 5 to 100 parts by weight per million parts of ethylene.

9. A process, as defined in claim 6, wherein the chain transfer agent is present in each portion of said zone in an amount of 0.5 to 10% by volume based on the ethylene.

References Cited in the file of this patent

UNITED STATES PATENTS

| | | |
|---|---|---|
| 2,317,878 | Bannon | Apr. 27, 1943 |
| 2,542,559 | Nelson et al. | Feb. 20, 1951 |
| 2,586,322 | Franta | Feb. 19, 1952 |
| 2,694,700 | Shanta | Nov. 16, 1954 |
| 2,783,187 | Odell | Feb. 26, 1957 |
| 2,815,334 | Killey et al. | Dec. 3, 1957 |
| 2,846,427 | Findlay | Aug. 5, 1958 |
| 2,849,429 | Cines | Aug. 26, 1958 |
| 2,865,903 | Seed | Dec. 23, 1958 |

FOREIGN PATENTS

| | | |
|---|---|---|
| 584,794 | Great Britain | Jan. 27, 1947 |